United States Patent [19]
Aya

[11] Patent Number: 4,833,608
[45] Date of Patent: May 23, 1989

[54] ELECTRONIC CASH REGISTER WHICH RECORDS THE TIME WHEN THE QUANTITY OF AN ITEM IN STOCK FALLS TO A PREDETERMINED NUMBER

[75] Inventor: Hideaki Aya, Kyoto, Japan

[73] Assignee: Omron Tateisi Electronics Co., Kyoto, Japan

[21] Appl. No.: 10,981

[22] Filed: Feb. 5, 1987

[30] Foreign Application Priority Data

Feb. 21, 1986 [JP] Japan .................................. 61-38002

[51] Int. Cl.$^4$ ...................... G06F 15/24; G06F 15/21; G07G 1/12
[52] U.S. Cl. .................................... 364/404; 364/405
[58] Field of Search ................. 364/404, 405; 235/385

[56] References Cited

U.S. PATENT DOCUMENTS

3,989,929 11/1976 Treiber ................................ 235/432
4,737,910 4/1988 Kimbrow ........................ 235/385 X

FOREIGN PATENT DOCUMENTS

0078375 6/1980 Japan .
0157061 12/1980 Japan .
0141770 9/1982 Japan .
0027258 2/1983 Japan .................................. 364/404
2162665 2/1986 United Kingdom .

OTHER PUBLICATIONS

Allmendinger, G. et al. "Point-of-Sale Terminal System with Clerical Facilities/Functions", *IBM Tech. Discl. Bull.*, vol. 18, No. 8, Jan. 1976, 2554–2555.

Primary Examiner—Clark A. Jablon
Attorney, Agent, or Firm—Stevens, Davis, Miller & Mosher

[57] ABSTRACT

An electronic cash register (ECR) comprises a memory for storing the stocked quantity of a commodity item, the transaction time, and the sale amount with respect to each commodity item; a clock for producing a present time; and a keyboard for instructing the output of a report in connection with an end-of-day sales processing. The transaction time stored in the memory is updated every time a transaction is performed with respect to each commodity item. The ECR determines when the stocked quantity of each commodity item is reduced to a predetermined number, e.g., zero. The transaction time finally stored in the memory is printed out together with data representing an associated commodity item in response to instruction by the keyboard for each commodity item whose stocked quantity is detected as having been reduced to said predetermined number.

2 Claims, 2 Drawing Sheets

FIG. 1
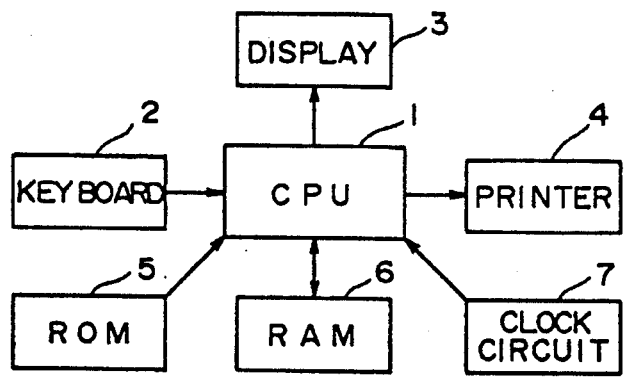
FIG. 2
| 60 — | ITEM CODE | UNIT PRICE | — 65 |
| --- | --- | --- | --- |
| 61 — | DEPARTMENT CODE | TOTAL AMOUNT | — 66 |
| 62 — | SALE NUMBER | TRANSACTION TIME | — 67 |
| 63 — | STOCK NUMBER | -------- | |
| 64 — | STOCK DATE | -------- | |
FIG. 4
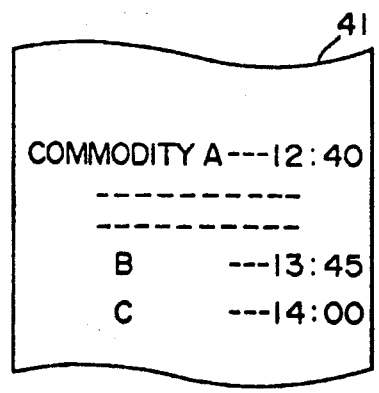

ELECTRONIC CASH REGISTER WHICH RECORDS THE TIME WHEN THE QUANTITY OF AN ITEM IN STOCK FALLS TO A PREDETERMINED NUMBER

BACKGROUND OF THE INVENTION

1. Field of the Invention

This invention relates to an electronic cash register (ECR), particularly an ECR for issuing a report on the time when the quantity of an in-stock commodity item is reduced to a predetermined number.

2. Discussion of the Prior Art

It is well known that there are ECRs which contain unit prices, which can be operated for transactions by entering commodity item codes without price data. This input method is called "price look-up" (PUU), because a transaction is performed by looking up the unit prices prestored in the ECRs. These ECRs are provided with memory locations with respect to each commodity item where a corresponding sale amount, i.e., price, is respectively stored.

Heretofore, ECRs have also been capable of issuing a report on a sale amount on the basis of transaction data stored in memory. However, if a commodity item runs out of stock during the day, it is difficult to tell the quantity of such a commodity item which sells in a whole day. This makes it quite difficult to arrange in advance the quantity to stock for such a commodity item.

SUMMARY OF THE INVENTION

It is accordingly, a primary object of this invention to provide an ECR which overcomes the above-mentioned disadvantages by indicating the time when the in-stock quantity of a commodity item falls to a predetermined number. For example, if the number of items in stock falls to zero, this indicates an out-of-stock condition and the ECR indicates the time when this occurs.

The invention is an ECR which includes a memory for storing the stock of quantity of each commodity item which is in stock, the transaction time, and the sale amount with respect to each commodity item; a clock for producing a present time; a keyboard for instructing the output of a report in connection with the sale amount of a day or portion thereof; update means for updating the transaction time stored in the memory every time a transaction is performed; detection means for detecting when the in-stock quantity of a commodity item is reduced to a predetermined number; and a printer for printing each commodity item and its sale amount in response to an instruction by the keyboard and for printing a transaction time finally stored in the memory for each commodity item whose in-stock quantity is detected by said detection means as having been reduced to the predetermined number.

Other objects and advantages of this invention will be apparent from the following description provided in conjunction with the accompanying drawings.

BRIEF DESCRIPTION OF THE DRAWINGS

FIG. 1 is a block diagram of an ECR constructed in a preferred embodiment of this invention.

FIG. 2 is a memory layout of the RAM 6 of FIG. 1.

FIG. 4 is a print form illustrating an out-of-stock report.

DETAILED DESCRIPTION OF THE INVENTION

Referring to FIG. 1, a CPU 1 has connected thereto a keyboard 2, display 3, printer 4, ROM 5, RAM 6 and clock circuit 7. The keyboard 2 is provided for entering transaction data such as commodity item codes and for instructing the output of a report for a day or other period of time. Numeral keys and various kinds of function keys are included in the keyboard 2. The display 3, for instance, shows the unit price data of a commodity item responsive to the entering of its item code. The printer 4 is used for printing out receipts, and the out-of-stock report shown in FIG. 4.

Figure 3A:
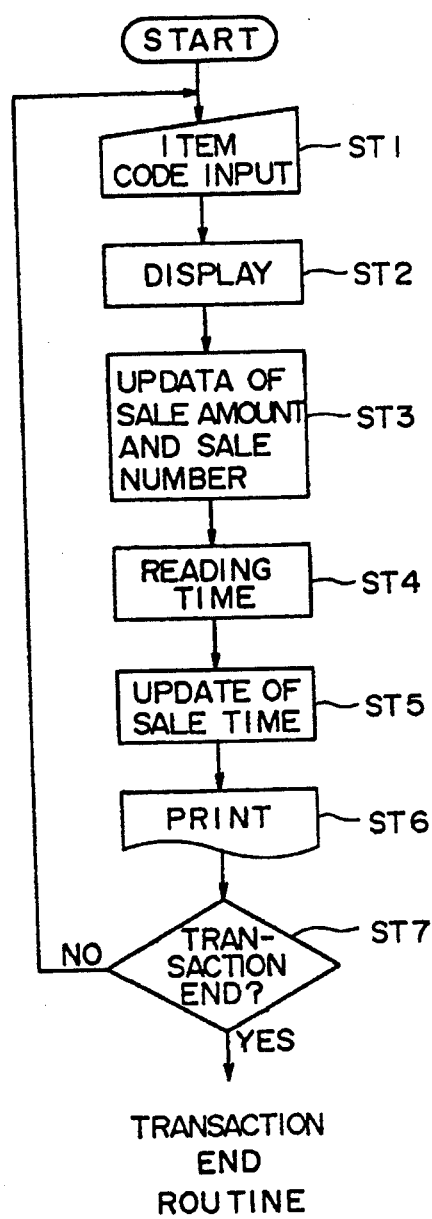
FIG. 3A is a flowchart illustrating a transaction operation.
Figure 3B:
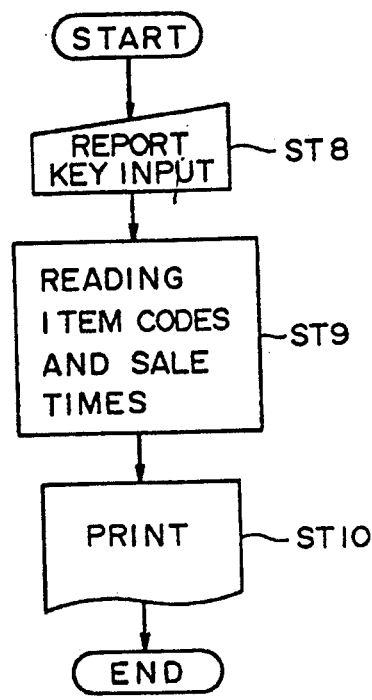
FIG. 3B is a flowchart illustrating a reporting operation.

The ROM 5 has stored therein operation programs which are illustrated in FIGS. 3A and 3B. The RAM 6 contains various memory areas part of which are representatively shown in FIG. 2. The clock circuit 7 is used for an indication of present time.

FIG. 2 shows the memory areas which allocated for a single commodity item. It should be understood that there will be a plurality of such memory areas corresponding to the number of commodity items which a store has for sale. An area 60 stores an item code which is used for identifying the commodity. An area 61 stores a department code into which the commodity is classified. Areas 62 and 63 store the number of commodity items sold (sale number) and the number of the commodity items which were previously stocked (stock number), respectively. An area 64 stores a stock date of the commodity. Areas 65 and 66 store a unit price and a total sales amount of the commodity respectively. An area 67 stores the last sale time, i.e., transaction time, for the commodity item.

Such data as item codes, department codes, stock numbers, stock dates, and unit prices are prestored before a transaction occurs. The sale number, sale amount, and sale time, are updated every time the commodity item is sold and transacted FIG. 4 shows an out-of-stock report 41 which is printed out by printer 4 shown in FIG. 1. The report 41 has printed thereon, for instance, in time order the names and final sale times of commodities which have been sold out during the day.

Referring to FIG. 3A, an operator enters an item code of commodity C or "0100" in step 1 (hereinafter the steps of the flowchart are identified as "ST"). CPU 1 searches memory areas corresponding to commodity C on the basis of the entered item code, and displays the content of area 65, or the unit price of commodity C in display 3 (ST 2). It should be noted that the memory areas as shown in FIG. 2 correspond to commodity C.

Following this, CPU 1 updates data such as the quantity sold and sale amount respectively stored in areas 62 and 66 in ST 3. After this, CPU reads a present time out of clock circuit 7 in ST 4 and stores it in area 67 as data representing the sale time. At this time, the previously stored sale time is replaced by the new time (ST 5). Thus, a sale time is updated each time a transaction occurs for commodity C, so that the sold-out time of commodity C is stored in area 67, if it is sold out.

Following the update of sale time, CPU 1 prints out on a slip (not shown) transaction data such as item code "0100", department code "003", and price of commodity C in ST 6. In ST 7, if there are other items to be transacted, the operator continues his transaction entry processing so that CPU goes back to ST 1. If no other items are left, CPU 1 advances from ST 7 to a transaction end routine (not shown).

Referring to FIG. 3B, a report output operation will be described hereinafter. After the completion of the transactions for a day or other defined period, the operator sets a report output mode using a mode selection switch (not shown) provided in keyboard 2. In this mode, an out-of-stock report 41, as shown in FIG. 4, can be printed.

In ST 8 (FIG. 3B), the operator depresses a report key. In response to this key operation, CPU 1 subtracts the number of items sold, stored in area 62, from the number of items which were stocked, stored in area 63. This provides the number of commodity item remaining in stock. If there are items in which the result of such subtraction is zero, CPU 1 reads the item codes from area 60 and sale times from area 67 (step 9) and prints on a slip such item codes or commodity names together with the sale times representing the times when such items were sold out (ST 10). The commodity titles can be printed out by referring to a table (not shown) provided in RAM 6 which stores item codes and commodity names corresponding to such item codes.

The manager is informed of the sold-out time by the out-of-stock report 41 with respect to each item, so that he can easily and exactly predict the quantity of each item to stock on the basis of the sold-out time.

In the embodiment described above, a sale number is subtracted from a stock number to see if the item is sold out. Instead of this operation, the stock number stored in area 63 may be counted down to see if it becomes zero. Moreover, the sale time may be stored only when the stock number becomes zero, if desired. It is also possible to indicate and print when the quantity of in-stock commodity item falls to a predetermined non-zero number. For example, in ST 9 (FIG. 3B) the CPU can read the item codes and sale times for those items whose in-stock quantity, after subtraction, falls to a predetermined number, which would indicate a low-stock condition and when it occurred.

The invention is not limited to the specific embodiments described above, as various changes and modifications thereof can be made without departing from the spirit and scope of the invention. Accordingly, the invention is not limited by the foregoing description, but is only limited by the scope of the claims appended hereto.

What is claimed is:

1. An electronic cash register, comprising:

means for storing data representing the quantity of a commodity item which has been stocked, a transaction time, and a sale amount with respect to each of a plurality of commodity items;

clock means for producing a present time;

command means for instructing the output of a report in connection with sales transactions which have occurred during a period of time;

update means for updating said transaction time stored in said means for storing data with the present time from said clock means for a given commodity item each time a transaction is performed with respect to said given commodity item;

detection means for detecting that the in-stock quantity of a commodity item has been reduced to zero; and, means responsive to said command means and said detection means for printing data identifying each commodity item whose in-stock quantity has been detected as having been reduced to said zero, together with data representing the time when such reduction occurred.

2. An electronic cash register, comprising:

means for storing data representing at least an in-stock quantity and a time of last transaction for each of a plurality of commodity items;

clock means for producing a present time;

command means for instructing the output of a report in connection with sales transactions which have occurred during a period of time;

means responsive to operation of said command means for detecting, for each of said plurality of commodity items, and in-stock quantity which has been reduced to zero and for identifying the last transaction time for each such detected commodity item; and, print means responsive to operation of said detection means for printing data identifying each commodity item detected by said detecting means together with its associated last transaction time.

* * * * *